S. FISCHER.
PROCESS OF EXTRACTING VANADIUM FROM CARNOTITE CONCENTRATES.
APPLICATION FILED APR. 9, 1912.
1,054,102.
Patented Feb. 25, 1913.
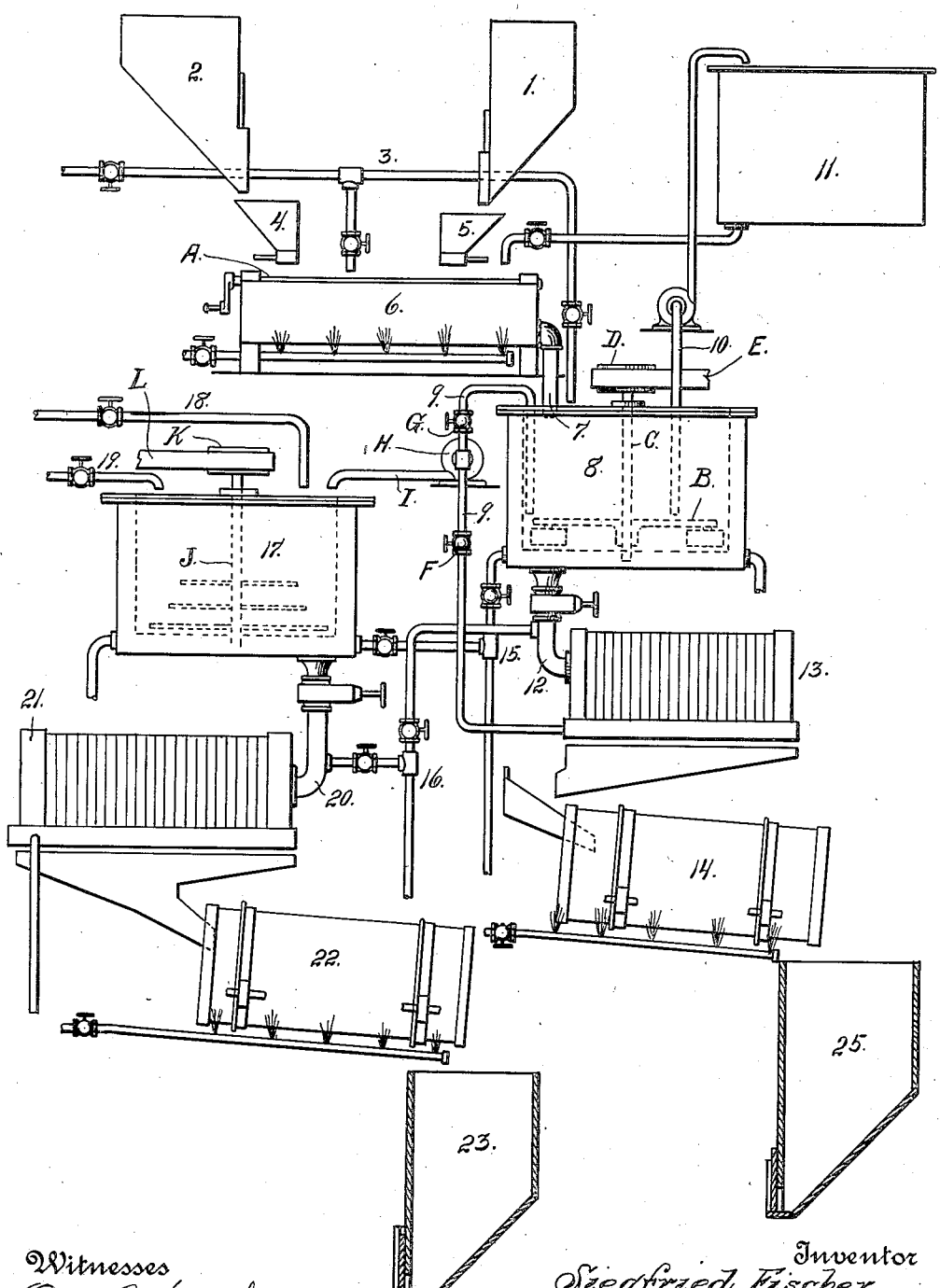

UNITED STATES PATENT OFFICE.

SIEGFRIED FISCHER, OF GOLDEN, COLORADO, ASSIGNOR OF ONE-FOURTH TO ROBERT E. BOORAEM, OF NEW YORK, N. Y., AND ONE-FOURTH TO C. R. HILL, OF GOLDEN, COLORADO.

PROCESS OF EXTRACTING VANADIUM FROM CARNOTITE CONCENTRATES.

1,054,102. Specification of Letters Patent. Patented Feb. 25, 1913.

Application filed April 9, 1912. Serial No. 689,640.

*To all whom it may concern:*

Be it known that I, SIEGFRIED FISCHER, a citizen of the United States, residing at Golden, county of Jefferson, and State of Colorado, have invented certain new and useful Improvements in Processes of Extracting Vanadium from Carnotite Concentrates; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a process of extracting vanadium from carnotite concentrates, or rich carnotite ore low in gangue.

In carrying out my process I employ small amounts of sodium or potassium hydroxid to large amounts of the carnotite concentrates or rich carnotite ores. The sodium or potassium hydroxid may be referred to in the specification under the general term "caustic." The caustic soda or potassium is mixed with carnotite concentrates in the proportion of one part of caustic to five parts of the concentrate. The caustic is put into an evaporator and roaster and enough water is added to make a plastic paste with the required amount of concentrates. The evaporator and roaster is then heated by suitable means, a stirrer being employed to facilitate evaporation and to prevent the material from caking. When the evaporation is finished for the first time, fresh water is added and the operation is repeated as often as is necessary, according to results obtained on each individual ore in the laboratory. After the necessary evaporation, the material is roasted at 120 to 200 degrees centigrade for about half an hour. The dry material is then conducted to a leaching vat which is steam-jacketed and equipped with a stirring device. Water is then introduced after which the mass is stirred and heated. Steam is also introduced and the pulp is allowed to settle, and if so desired the first liquor may be drawn off into a separate tank and re-used on a new batch of concentrates. If not required for retreatment, the liquid may be drawn off directly into a precipitation tank. The material is retreated in the leaching tank until a sample of the extraction liquor shows no signs or only traces of vanadium. The liquor is all drawn off from the leaching tank and collected in the precipitation tank. The solid material left in the leaching tank is filtered and any liquor pressed out of it is carried to the precipitation tank. The solid material left after filtering is taken out and dried, and the dried material stored in a bin. This material contains all of the uranium and radium and small amounts of vanadium.

The liquor in the precipitation tank is neutralized by means of sulfuric acid and vanadium is precipitated as iron-vanadate by means of ferrous-sulfate. After precipitation, the liquor and solids pass through a filtering device, the solids being washed with water to eliminate soluble foreign material. The solid material is then conveyed from the precipitation tank to a drier. From the drier, the solid iron-vanadate goes to a receptacle from which it may be taken and treated to ferro-vanadium alloy by the electric furnace or the Goldschmidt process.

Having outlined my process, reference will now be made to the drawing in which is outlined a suitable apparatus for practising the process though it must be understood that the present invention is in no way limited to any particular apparatus.

In this drawing: Let the numeral 1 designate a bin containing the caustic soda or potassium. From this bin a certain amount of caustic is delivered to a feeder 5, while a suitable amount of carnotite concentrates is discharged from a bin 2 into a feeder 4. The proportions of concentrates and caustic in the two feeders are 5 of the former to 1 of the latter. From these feeders the caustic and concentrates are discharged into an evaporator and roaster 6 in which enough water is added from a water-main 3 to make a plastic paste in the evaporator and roaster. The material is then heated in the roaster by suitable means, stirring means A being employed to facilitate evaporation and to prevent the material from caking. When the evaporation is finished for the first time, fresh water is added and the operation repeated as often as is necessary, according to results obtained on each individual ore in the laboratory. After the necessary evaporation the material is roasted at 120 to 200 degrees centigrade for about half an hour.

The composition of carnotite in pure form has not been found as yet, but it is assumed to be a potassium-uranium-vanadate, according to Hillebrand. The chemical structure probably is as follows:

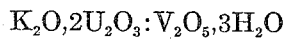

On treating this compound with the hydrate, the compound is broken up and forms a soluble sodium vanadate $NaVO_3$ and an insoluble sodium uranate

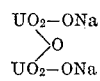

The carnotite formula, not having been definitely defined, it would be impossible to give any chemical equation.

The dry material is then conducted through a conduit 7 to a leaching-vat 8 which is steam-jacketed and has a frictional stirring device B connected with a vertically-disposed shaft C carrying a pulley D connected with a suitable motor by a belt E. Water is introduced to the leaching vat by means of the main 3 after which the material is stirred and heated. Steam is introduced to the vat 8 through a pipe-member 15. The material is then allowed to settle, and if desired, the first liquor may be drawn off by means of a pump 10 into a tank 11 and used over on a new batch of concentrates. If not required for retreatment, the liquor may be drawn off directly into a precipitation tank 17 by means of a conduit 9. The material in the vat 8 is then retreated by the introduction of additional water until a sample of the extraction-liquor shows no sign or only traces of vanadium. All the leaching liquor having been now removed from the leaching vat 8 to the precipitation tank 17, the solid material left in the leaching vat is carried by a conduit 12 to a filter-press 13. All the liquor pressed out of the material in this filter-press is carried to the precipitation tank through a pipe 9. In this case, a valve F in the lower portion of the pipe 9 is opened and a valve G in the upper portion of the pipe closed, a centrifugal pump H being employed to remove the liquor from the filter-press 13, the same being discharged through a branch-pipe I into the precipitation tank 17. When the liquor from the leaching-vat 8 is carried to the precipitation tank, the valve F is closed and the valve G opened, the centrifugal pump H being employed to draw the liquor from the vat 8 through the upper portion of the pipe 9, the said liquor passing to the precipitation tank through the said branch-pipe I.

The solids left in the filter-press 13 are removed to a drier 14 whence they are taken and stored in a bin 25. This material in the bin 25 contains all of the uranium and radium and small amounts of vanadium. In other words, the bin 25 contains the tailings resulting from the treatment of the carnotite concentrates, the values being in the vanadium contained in the liquor carried to the precipitation tank 17. This tank is steam-jacketed and has a stirring apparatus J operated by a pulley K connected with a suitable motor (not shown) by means of a belt L.

The liquor in the tank 17 is neutralized by means of sulfuric acid introduced through a pipe 18 and the vanadium is precipitated in the tank 17 as iron-vanadate by means of ferrous-sulfate in the form of solution introduced through a pipe 19. After neutralization, sodium vanadate in solution results.

Adding ferrous sulfate, $FeSO_4$, the reaction is expressed by the following equation:

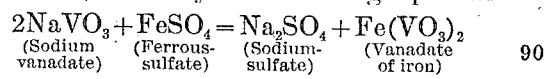

After precipitation, the liquor and solids are passed from the tank 17 through a conduit 20 to a filter-press 21 in which solids are washed with water from a pipe 16 to eliminate soluble foreign material. The solid material is then conveyed by any suitable means from the filter-press 21 to a drier 22 and dried at a temperature between 120 and 150 degrees centigrade. From the drier the solid iron-vanadate is passed to a bin 23 after which it may be formed into ferro-vanadium alloy by the electric furnace or the Goldschmidt process.

In addition to the treatment of carnotite concentrates, my improved process will also successfully treat vanadiferous sandstone concentrates.

Having thus described my invention, what I claim is:

1. A process of extracting vanadium from carnotite or vanadiferous sandstone concentrates, consisting in first mixing the ore with alkali hydrate in the presence of water to form a paste whereby the water acts as a vehicle to bring the hydrate into intimate contact with the ore particles, and evaporating to dryness by heat whereby the insoluble vanadium salts are changed into soluble vanadium salts.

2. A process of extracting vanadium from carnotite or vanadiferous sandstone concentrates, including mixing the ore with alkali hydrate in the presence of enough water to give the ore a pasty consistency whereby the alkali hydrate is brought into intimate contact with the ore particles, removing the water by evaporation, and finally roasting the material at a low temperature.

3. A process of extracting vanadium from carnotite or vanadiferous sandstone concentrates, including mixing the ore with alkali hydrate in the presence of enough water to give the mass a pasty consistency whereby the alkali hydrate is brought into intimate relation with the ore particles, removing the water by evaporation, roasting the resulting mass at a low temperature, and finally leaching by the employment of water, substantially as described.

In testimony whereof I affix my signature in presence of two witnesses.

SIEGFRIED FISCHER.

Witnesses:
A. J. O'BRIEN,
A. E. ADAMS.